US007257460B2

(12) United States Patent
Venugopal et al.

(10) Patent No.: US 7,257,460 B2
(45) Date of Patent: Aug. 14, 2007

(54) RECONFIGURABLE VARIABLE BLANK-HOLDER FORCE SYSTEM AND METHOD FOR SHEET METAL STAMPING

(76) Inventors: Ravinder Venugopal, 1804 Tupper St., #4, Montréal, Quebec (CA) H3H 1N4; Sameer Anand Joshi, 2617 Dekalb Pike, #318, Norristown, PA (US) 19401; Ananthakrishnan Surianarayanan, 2503, Longmeadow Rd., Lansdale, PA (US) 19446

( * ) Notice: Subject to any disclaimer, the term of this patent is extended or adjusted under 35 U.S.C. 154(b) by 196 days.

(21) Appl. No.: 11/190,359

(22) Filed: Jul. 27, 2005

(65) Prior Publication Data

US 2007/0032900 A1 Feb. 8, 2007

(51) Int. Cl.
*B21D 22/21* (2006.01)
*G06F 19/00* (2006.01)

(52) U.S. Cl. ........................................ 700/146; 72/351

(58) Field of Classification Search ................ 700/146; 72/57, 334, 251; 76/107.4
See application file for complete search history.

*Primary Examiner*—Leo Picard
*Assistant Examiner*—Sheela S. Rao

(57) ABSTRACT

A reconfigurable variable blank-holder force system (and method) for producing sheet metal stampings comprises a portable hydraulic unit, controlled by a digital control system and a knowledge-based expert system to enable reconfigurability and an easy transition from the try-out stage to production. The knowledge-base has a hierarchical structure and includes stored information about part geometry, material properties and press parameters. The expert system enables an operator to determine optimal blank-holder forces, and to fine-tune through a graphical interface unit. The optimal blank-holder forces are generated by hydraulic force actuators, using a controller running a nonlinear algorithm that accounts for valve nonlinearities, variable flow-rate and numbers of operational cylinders. The portable hydraulic unit preferably comprises hydraulic cylinders with quick disconnect hoses, a manifold, servo-valves and a pump unit. A structured method to utilize this system to produce sheet metal stampings is also described. An article embodying the method is included.

29 Claims, 7 Drawing Sheets

RECONFIGURABLE VARIABLE BLANK-HOLDER FORCE SYSTEM AND METHOD FOR SHEET METAL STAMPING

FIELD OF THE INVENTION

This invention generally relates to sheet metal stampings, and more particularly to a reconfigurable knowledge-based variable blank-holder force system and method for sheet metal stamping.

BACKGROUND OF THE INVENTION

Sheet metal stamping is an indispensable and significant process because it is well suited to mass production of a wide variety of parts. In the automotive industry, it is used to make several body parts such as doors, hoods and lift-gates. Several other industries such as the consumer appliance industry and the aerospace industry use sheet metal stamping extensively. It is highly desirable to ensure high quality standards for sheet metal stampings so as to avoid problems during subsequent assembly stages and to ensure that the form and finish meet requirements. A publication by Ananthakrishnan S., Agrawal S., Venugopal R., and Demeri M., entitled "RCS Based Hardware-in-the-loop Intelligent System Design and Performance Measurement," in Proceedings of PerMIS 2002, NIST, Gaithersburg, Md., 2002, teaches design of an intelligent system with applications to manufacturing, based on a Real Time Control System (RCS) architecture. The Ananthakrishnan publication describes case studies on how the RCS architecture can be used in a flexible automation scenario, where traditional industrial control cards (hardware) do not provide adequate measures of performance. In addition, certain tooling concepts and blank-holder force actuator control units with individually controlled hydraulic cylinders have been developed to allow local control of metal flow into the die cavity during a stamping operation. Forces are applied on the sheet metal blank using hydraulic cylinders which are mounted on the lower bolster of a hydraulic press. In the known type of hydraulic or mechanical press, a ram depresses the piston of each of the hydraulic cylinders via the blank and tooling in a blank-holder force actuator area to raise the pressure inside the cylinders. The pressure is transferred to the blank. A closed-loop control system modulates the flow of hydraulic fluid from the cylinder. In known arrangements, pressure within the cylinder is difficult to control using commercially available PID (Proportional-Integral-Derivative) control cards. The few systems that are available presently are systems of hydraulic cylinders installed in the bed of the press (under the die). The hydraulic cylinders used to provide force actuation in known systems are placed in fixed locations in the bed of one particular press, and the force actuators are configured for operation in that press. In essence, these systems are not flexible and are customized for one particular press and thus tend to be very expensive.

The production of sheet metal stamping parts involves two distinct phases, namely, try-out and production. In the try-out phase, the die design is validated, and required process parameters (blank-holder force actuator forces, punch force etc.) are determined. Try-out is conducted by attempting to make the part and modifying the die and process parameters, until a part is consistently made within the required design tolerances. After successful try-out, the final die design and process parameters are transferred to a production unit that mass produces the part. In practice, try-out and production are typically conducted by different companies in different locations.

It is desirable to provide a system and method for sheet metal stamping that would offer reconfigurability utilizing a knowledge-base, as well as the most economy and flexibility in design, and in doing so, address the needs of both try-out and production.

SUMMARY OF THE INVENTION

The invention in one form discloses a knowledge-based reconfigurable variable blank-holder force system for producing sheet metal stampings and, in one example uses a portable unit providing a flexible configuration for a plurality of blank-holder force actuation units. A multi-channel digital controller allows implementation of a non-linear pressure control algorithm that can accommodate variations in monitored parameters such as press-speed, required force levels, and the number of blank holder units, in addition to interacting with an expert system that generates optimal actuator force values using a knowledge-base comprising of part, material and press parameters. Preferably, the blank holder units comprise hydraulic cylinders with servo-valves and quick disconnect hoses and couplings. The system uses a nonlinear algorithm and a software environment interacting with an operator-assisted GUI (graphic interface unit) and takes several variables into account including a variable number of operational hydraulic cylinders, valve non-linearity and pressure drops across hoses for the hydraulic cylinders. The system enables an easy transition from a try-out stage to the manufacturing stage for stamping production. The system may include optional sensors for monitoring frictional force and stamping material flow.

In a simple variable blank holder force system without any provision for reconfiguration, a stamped metal part is made by holding a blank between a punch and a die, which are in the shape of the part to be formed and geometric negatives of each other (See FIG. 1). The punch is attached to the ram of a stamping press. The ram is driven down using a mechanical or hydraulic drive. During the forming process, the punch (driven by the ram) impacts the blank and draws the metal into the lower portion of the die to form the sheet metal blank in the desired shape. However, the part may develop defects including tears or wrinkles during this process owing to a variety of factors. These defects can be corrected by adjusting the forces holding the blank (blank-holder actuator forces); in other words, if tearing seems imminent at any point during the forming cycle, the blank holder forces are reduced to allow more material to flow and thus avoid tearing. Conversely, if wrinkling is imminent, the blank-holder actuator forces are increased to restrict material flow and thus "stretch out" the wrinkles.

While the concept is intuitively attractive and several simulation based studies point to the value of utilizing such a system, the technology has not been widely deployed in production because of several limitations experienced in currently available force-generating systems. The value of the proposed invention is generated by addressing these issues to result in an effective industrial solution, by providing a reconfigurable system suitable for "try-out" and also for manufacture of sheet metal stampings.

In order for variable blank-holder force technology to be beneficial in production, it is desirable that the technology be accessible to try-out companies, and meets the needs of try-out companies. If try-out companies cannot provide the parameters required for variable blank-holder forces, production units have no easy way of acquiring the knowledge required to implement the technology. Try-out companies are usually much smaller than production companies and typically do not have the financial resources to procure the press-customized systems that are currently available. Try-out companies also need to be able to rapidly reconfigure the force actuation systems to apply the required forces at the desired locations where defects are observed, adjust the forces during the stroke for each new location and deal with a variety of part geometries, material and presses. Thus, for the purposes of try-out, a variable blank-holder system has to be flexible and reconfigurable. Such a system would also be readily transferable to a production environment due to its reconfigurability. In addition, a knowledge-based system for monitoring and providing feedback for appropriate force selection would greatly improve process-efficiency.

Thus, in order to effectively bring variable blank-holder technology into the mainstream, the force generating mechanism should preferably have the following characteristics:

1. Knowledge-based reconfigurability (with respect to part geometry, material, location and force profiles of cylinders as well as to various presses and dies).
2. Ability to monitor the process and provide feedback to the operator.
3. Cost at an acceptable level for try-out companies.

Technical Summary of Variable Blank-Holder Force Actuation System

A preferred example of a functional mechanism for generating blank-holder forces is generally through the use of nitrogen or hydraulic cylinders located under the die (or in some cases over the punch). For variable force generation, hydraulic cylinders are preferred. Hydraulic fluid in each cylinder is compressed by a piston. The work piece is deformed into the die by the impact of the ram on the die (FIG. 2). The pressure developed due to the compression is regulated by a servo-valve illustrated in FIG. 2, usually with a built-in pressure control analog circuit to ensure that the desired force is generated during the stroke. A controller that cooperates with the analog circuit is tuned for operation in a particular press, and the servo-valve is typically mounted on or near the hydraulic cylinder.

One embodiment of the invention resides in a method of achieving knowledge-based reconfigurability in a variable force system for working on a sheet metal blank, comprising: using movable blank-holder force actuators and variable blank-holder forces to hold and support said sheet metal blank at a first set of blank-holder force actuator locations; monitoring a first set of parameters selectively including punch force, blank-holder actuator numbers and locations, and blank-holder force magnitudes at said movable blank-holder actuators; inspecting a sheet metal stamping work piece produced using said first set of parameters; noting differences between characteristics of a sample work piece fabricated using said first set of parameters and requirements of an acceptable sheet metal stamping work piece; and, using said differences and knowledge-based inputs from an expert system to arrive at a second set of new reconfigurable parameters for improving acceptability of the work piece.

A second embodiment of the invention resides in a knowledge-based variable blank-holder force system for performing sheet metal stamping operations, comprising: movable blank-holder force actuators to hold and support said sheet metal stamping at a first set of locations; sensors associated with said movable blank-holder force actuators for monitoring parameters associated with the blank-holder force actuators including blank-holder force actuator locations and force magnitudes at the blank-holder force actuator locations; a user interface for viewing and using a first set of parameters for a trial run and for recording differences between a stamped sheet metal from the trial run compared with requirements in an acceptable stamped sheet metal work piece; and, a controllable knowledge based arrangement for arriving at a second set of parameters based on said differences, to result in an acceptable sheet metal stamping. The method and system described herein expediently use an expert system, layers of software, a hierarchical knowledge-base and user interface inputs to enable the user to selectively perform monitoring and provide control information to said system, and for automatically adjusting said first set of parameters to arrive at said second set of parameters, and progressively a new set of parameters as required. The knowledge based system takes into account various parameters which impact the quality and acceptability of the sheet metal work piece, including part geometry, material, location and force profiles of cylinders as well as various presses and dies, and the impact of the variations in the functioning of hydraulic accessories.

The invention also teaches an article having a software program thereon which when executed on a computing platform, results in a method of achieving reconfigurability in a blank-holder variable force system as recited hereinabove. The invention expediently uses an algorithm which can be modified to choose parameters after accounting for operational variations including changes in lubrication and misalignments and die-wear. The method described herein may use the step of automatically generating process and quality control metrics by selectively using past try-out runs and recommendations for a given stamping. The system taught herein may use a software module containing a software based expert system using information from past try-out runs and reconfigurable variable blank-holder force setting recommendations.

BRIEF DESCRIPTION OF THE DRAWING

A more detailed understanding of the invention may be had from the following description of preferred embodiments, given by way of example only and not as a limitation, to be understood in conjunction with the accompanying drawing wherein.

DETAILED DESCRIPTION OF EMBODIMENTS

In the following detailed description of the various embodiments of the invention, reference is made to the accompanying drawings that form a part hereof, and in which are shown specific embodiments by way of illustration, in which the invention may be practiced. These embodiments are described in sufficient detail to enable those skilled in the art to practice the invention, and it is to be understood that other embodiments may be utilized and that changes may be made without departing from the scope of the present invention. The following detailed description is therefore not to be taken in a limiting sense, and the scope of the present invention is defined only by the appended claims and their equivalents.

Figure 1:
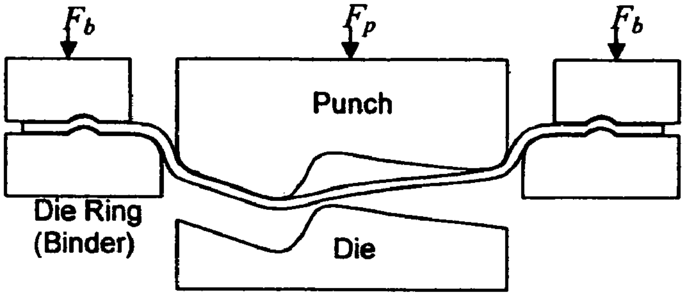
FIG. 1 is a diagrammatic illustration of forces acting on a sheet metal stamping during the stamping process.

FIG. 1 shows a typical arrangement for producing sheet metal stampings wherein a punch and a die are illustrated. Also shown for illustration are the punch force Fp and the blank-holder forces Fb. The description that follows makes references to how the blank-holder forces are monitored and controlled, among other parameters, using the reconfigurable feature, controls and the algorithm of the present invention.

Figure 2:
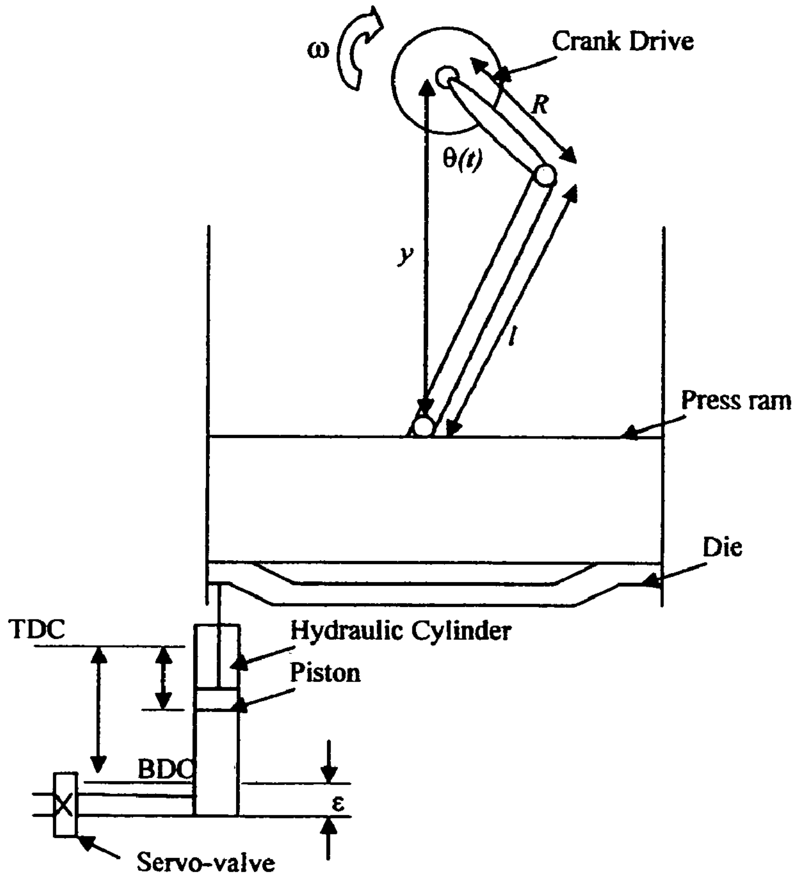
FIG. 2 illustrates a typical hydraulic force generation system for stamping operations.

FIG. 2 shows a typical crank drive arrangement coupled with a press ram which can exert force on a blank that is supported and held on the die. The press ram may be moved by mechanisms other than the crank drive that is illustrated. Also illustrated in FIG. 2 is a hydraulic cylinder with a piston, which is actuated by the action of a servo-valve to admit pressurized fluid into the cylinder as desired, in a controlled manner, using the invention. The piston within the cylinder moves between a top dead center (TDC) position and a bottom dead center (BDC) position.

Figure 3A:
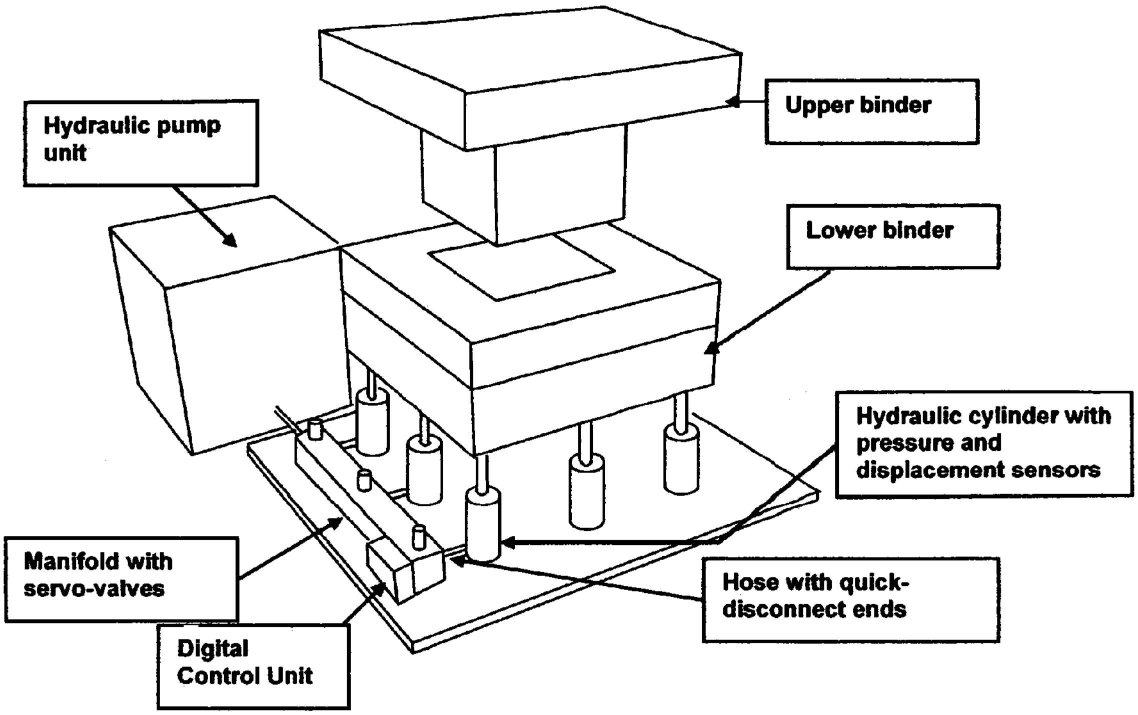
FIG. 3A shows a pictorial representation of an electro-hydraulic system in the sheet metal press.

FIG. 3A shows an isometric view of an electro-hydraulic system in the press including a hydraulic pump unit, upper binder, and a lower binder. The lower binder is supported and actuated by hydraulic cylinders with pressure and displacement sensors which are expediently provided with hoses having quick-disconnect ends. The hydraulic pump unit actuates a set of manifold servo-valves which are also controlled by a digital control unit.

Figure 3B:
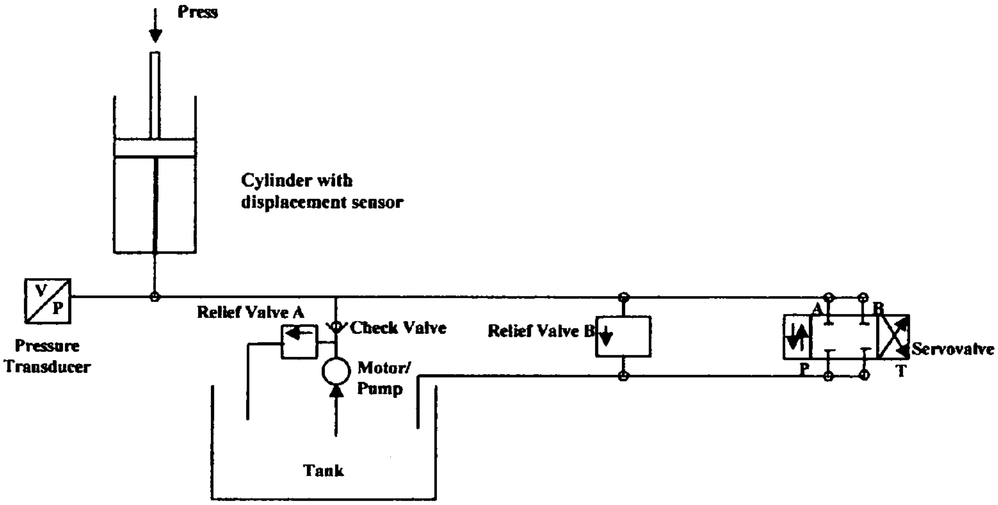
FIG. 3B illustrates an exemplary hydraulic schematic for one cylinder.

FIG. 3B illustrates a hydraulic schematic for one hydraulic cylinder as applied to the present embodiment. FIG. 3A illustrates several such hydraulic cylinders. FIG. 3B schematic shows the cylinder as having a displacement sensor (as in FIG. 3A), a pressure transducer, and a tank with hydraulic fluid which is pumped by the motor pump in a controlled manner. Also shown in FIG. 3B are relief valves and a check valve. The operational details of the schematic of FIG. 3B are intelligible to those who are skilled in the art.

Figure 4:
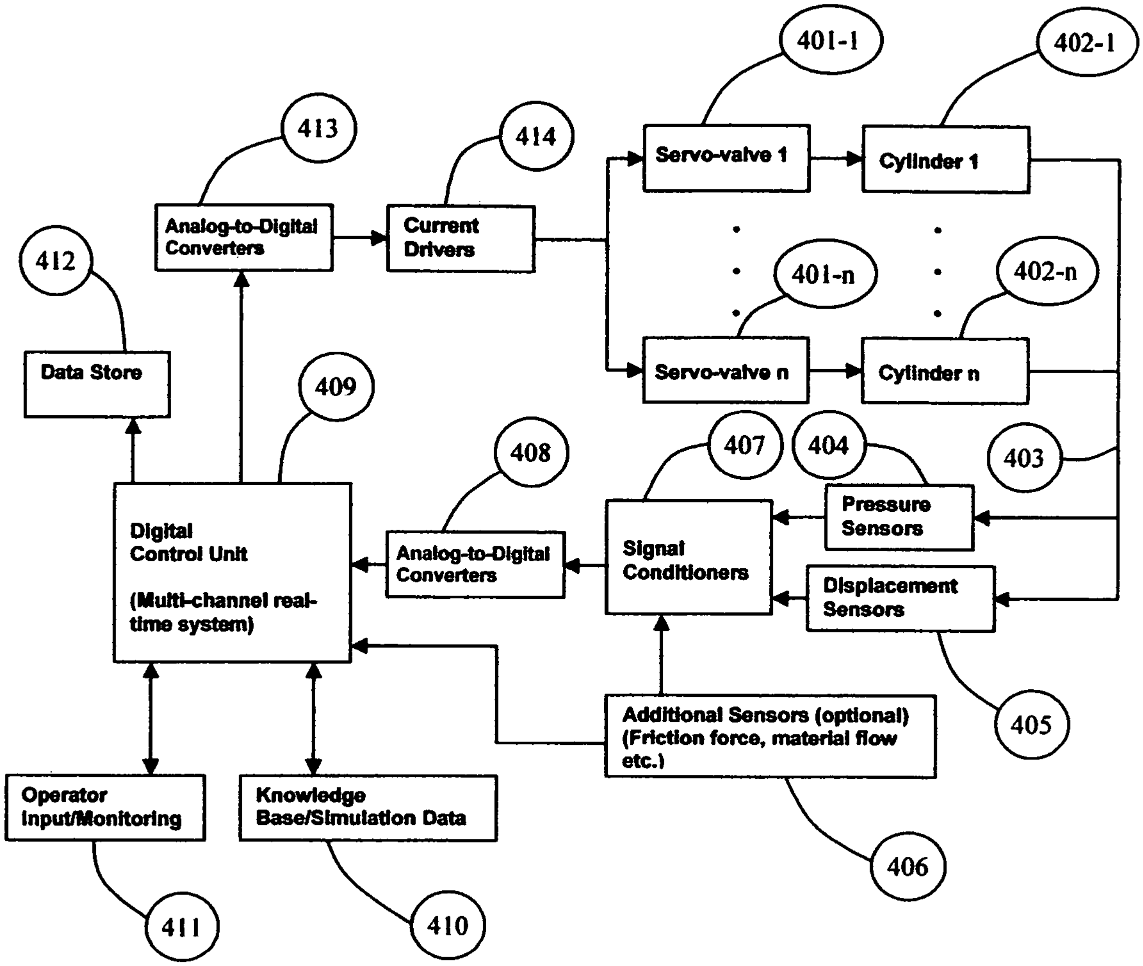
FIG. 4 illustrates a block diagram of an exemplary control schematic used in the practice of the invention.

FIG. 4 illustrates a block diagram schematic of a control system 400 which is part of a controllable arrangement and can be used in the reconfigurable variable blank-holder force system of the present embodiment. The control schematic illustrates hydraulic cylinders 1 to n which function in association with corresponding servo-valves 401. The system 400 includes pressure sensors 404, displacement sensors 405, and optional additional sensors 406. The additional sensors 406 might include, without limitation, sensors monitoring frictional force, material flow and other parameters. The sensor outputs are conditioned by signal conditioners 407 and converted to digital signals using A/D converters 408. A digital control unit 409 is at the heart of the system 400. A knowledge base/simulation data unit 410 cooperates with the digital control unit 409 and interacts with the A/D converter 408, and stores information necessary and helpful to assist in the implementation of an algorithm. An operator input/monitoring unit 411 is connected to interact with the digital control unit 409 and enables an operator to receive and also provide observations and other inputs necessary to control the quality of the manufactured metal stampings both during the try-out runs and regular production. A data store 412 acts as a repository for information required by the digital control unit 409 for the operation. Also shown is a block 413 showing D/A converters deriving inputs from the digital controller 409 and providing analog inputs to current drivers 414 and in turn analog control signals to the servo valves 1 to n. The digital control unit 409 may be a multi-channel real time system, or, any other control unit convenient for the purpose. The operator input/monitoring unit 411 may be a GUI or any other unit that can be operated by a user to interact with the system 400. Variation and additions may be made to the system 400 as necessary and convenient.

In existing systems, the cylinders are mounted in the press bed along a grid or in a specially designed blank-holder force actuator system at pre-determined locations. A pump and other hydraulic accessories are installed in or near the press to fill the cylinders with hydraulic fluid before each stroke of the press.

To allow reconfigurability, an exemplary embodiment of the proposed system is designed as follows:

1. Each cylinder will have a built-in pressure sensor and at least one cylinder in the system will have a displacement sensor to monitor cylinder motion.

2. The servo-valves for each cylinder will be mounted on a portable unit with a pump, necessary hydraulic accessories (piping, check valves, relief valves etc.) and a multi-channel digital controller to ensure pressure control in each cylinder. The portable unit will be on the shop-floor in a convenient location.

3. Each cylinder will be connected to a servo-valve on the portable unit using a flexible hose with quick-disconnect connections.

4. Each cylinder will have a base mount with a standard bolt pattern to enable easy mounting at any location under the die, over the punch or in the press as desired.

5. The multi-channel digital controller will use information from the displacement and pressure sensors to generate appropriate knowledge-based drive signals to the servo-valves using a nonlinear algorithm that accounts for variable press speed, thus allowing operation in a variety of mechanical and hydraulic presses. The nonlinear algorithm will also account for the nonlinear flow characteristics of typical servo-valves and for the pressure drop across the flexible hose.

6. A software environment with an intuitive GUI (graphic user interface) will be provided to allow monitoring of the force system to ensure that the system is delivering the appropriate force profile during the stroke, record blank holder force and punch force data and allow the operator to record pertinent try-out data (including press type, material type, hydraulic cylinder locations, part geometry, part quality at each attempt, test date and time etc).

7. A host personal computer will run the software environment, communicate with the multi-channel digital controller and generate knowledge-based inputs.

8. The software environment will allow for knowledge-based reconfigurability of operation i.e., provide the ability to run with any chosen number of cylinders (up to the maximum capacity of the portable unit) and the ability to generate part-specific force-profiles that vary during the press stroke to each operational cylinder.

The key objectives and features in the development of this system for generation of variable blank-holder forces for sheet metal stamping include:

1. Reconfigurability utilizing a knowledge-base containing part and process data.
2. Price reduction by accommodating try-out and production in the same system. The above objectives are met with the proposed design through a combination of innovative features in mechanical/hydraulic design, electrical design and software development.

First, the ability to easily connect one or more cylinders to the portable unit as required allows flexible configuration of the cylinders in the try-out set up. This is accomplished by having the servo-valves (which tend to be bulky with their manifolds) mounted on the portable unit (thus, freeing up space in the die area) and by the use of flexible quick disconnect hoses to connect the cylinders to the servo-valves.

Second, the use of a multi-channel digital controller allows the implementation of a nonlinear pressure control algorithm that can accommodate variations in press speed, required force levels and number of operational cylinders. In addition, it provides a means of obtaining real-time data for monitoring. It also reduces the cost of having a separate controller for each cylinder, customized for a particular press.

Third, the nonlinear control algorithm which accounts for press speed variations, variable numbers of operational cylinders, valve nonlinearities and pressure drop across hoses is in itself an innovation that is significant to the proposed system. While an algorithm in known art provides a basic framework for pressure control with variable ram speed, it shows simulated results and does not account for any of the other real-world factors including variable numbers of operational cylinders, valve nonlinearities and pressure drop across hoses.

Fourth, the software environment that allows monitoring, capture and recording of try-out data from sensors and operator input, along with a knowledge-based expert system for generating blank-holder force recommendations, is an innovation that provides additional value in terms of process efficiency.

The combination of these innovations provides a knowledge-based reconfigurable variable blank-holder force actuation system for sheet metal stamping that addresses the needs of the industry and allow implementation of a technology that will improve the efficiency of the sheet metal forming process immensely.

Figure 5A:
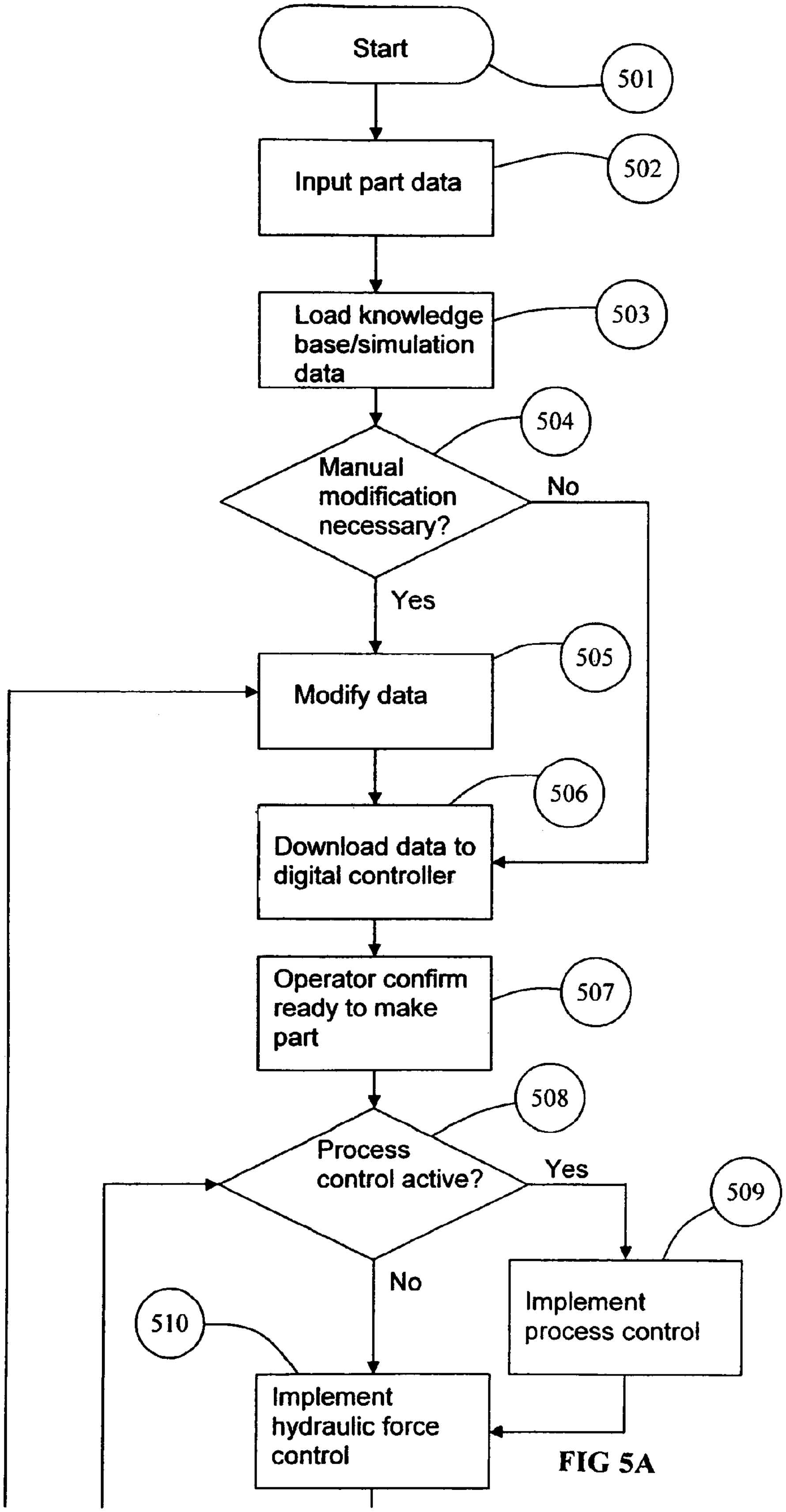
FIG. 5A and FIG. 5B illustrate a flow chart for implementation of an exemplary algorithm in the practice of the invention.
Figure 5B:
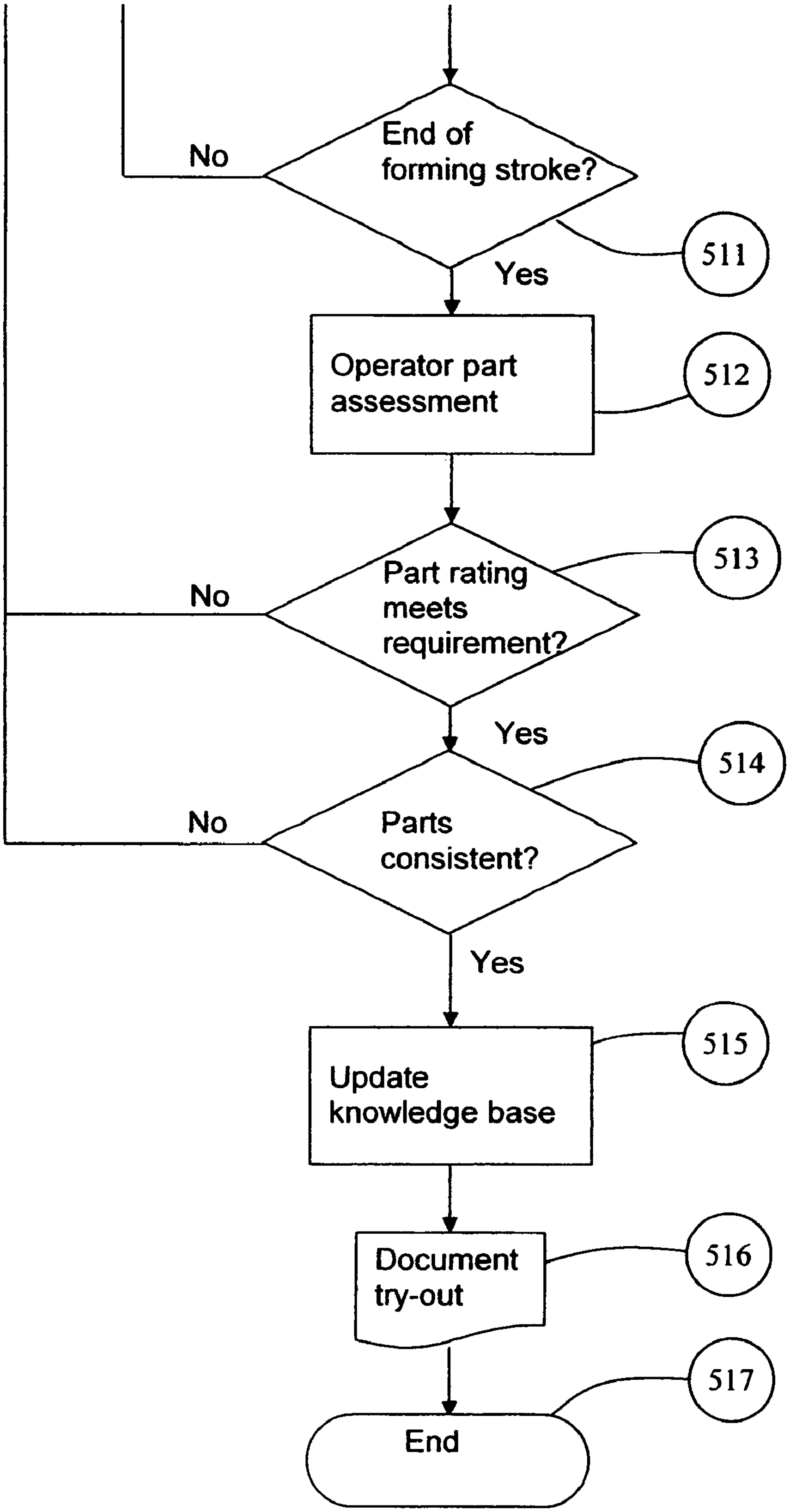

The method and system described herein provide reconfigurability using different layers of software and knowledge-based hierarchy. An exemplary algorithm to work with the system 400 is illustrated in FIG. 5, and includes the following sequence:

1. Start the process, step 501, and input part-data, step 502. 2. Load knowledge base/simulation data, step 503. 3. Is manual modification necessary? Step 504. 4. If affirmative, go to step 505 and modify data. If negative, go to step 506. 5. Step 506 consists in downloading data to digital controller. 6. Operator confirms readiness to make the part, step 507. 7. Is machine control active? Step 508. If affirmative, go to step 509 and implement machine control at step 509. If negative, go to step 510 and implement hydraulic force control. 8. Is it the end of forming-stroke? If negative, go back to step 508. If affirmative, go to step 512 and perform operator part-assessment. 9. Does part-rating meet requirement? Step 513. If negative, go back to step 505. 10. If affirmative, check in step 514 to see if parts are consistent. If negative, go back to step 505. 11. If affirmative, update knowledge base in step 515. 12. Document the try-out step at step 516. 13. End the process at step 517. The foregoing sequence is exemplary, and the steps therein can be modified to cater variations covered by the invention.

Figure 6:
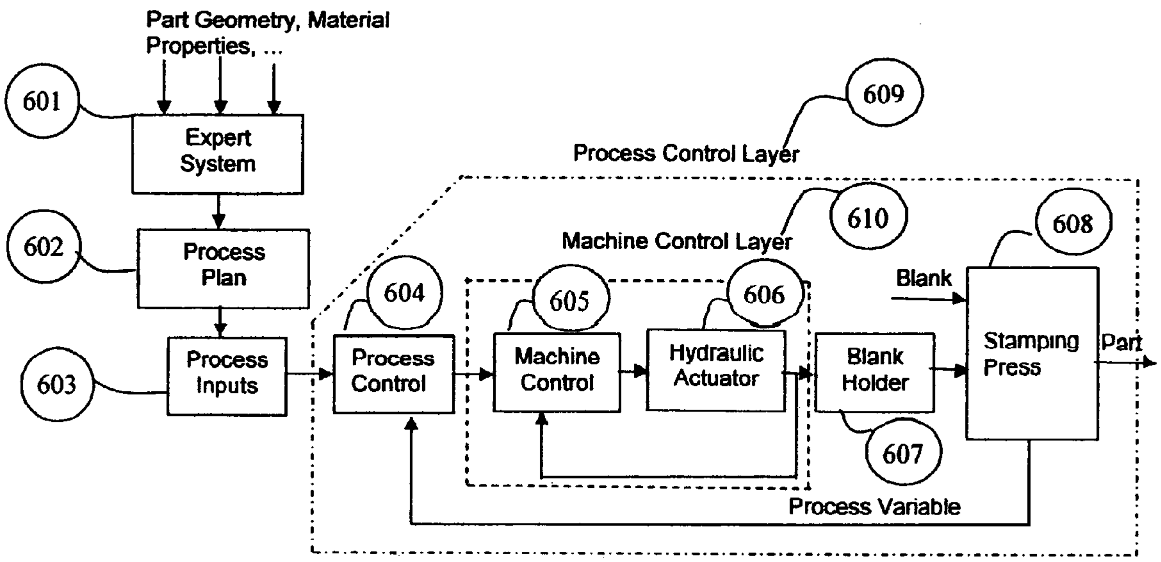
FIG. 6 illustrates interaction between a knowledge-based expert system and other process stages.

FIG. 6 illustrates the interaction between the expert system and other process stages. As shown, expert system 601 provides required information for the process plan unit 602, which feeds process input block 603. Block 603 provides signals to process control block 604. Process control block 604 controls machine control unit 605 which in turn provides signals to hydraulic actuator 606. Hydraulic actuator 606 provides required inputs to blank holder unit 607, which interacts with stamping press 608, enabling a suitable stamping to be produced from a blank. Functionally, machine control unit 605 and hydraulic actuator 606 together constitute machine control layer 610. In operation, machine control layer 610 including process control block 604 serve to function as process control layer 609. The expert system 601 influences the process plan which provides inputs for the process control layer 609. It is noted that the process control layer 609 generates inputs for the machine control layer 610. Also, process control block 604 receives process variable feedback signals from sensors in the stamping press and/or tooling 608, and machine control unit 605 receives feedback signals from the sensors in the hydraulic actuators 606.

Figure 7:
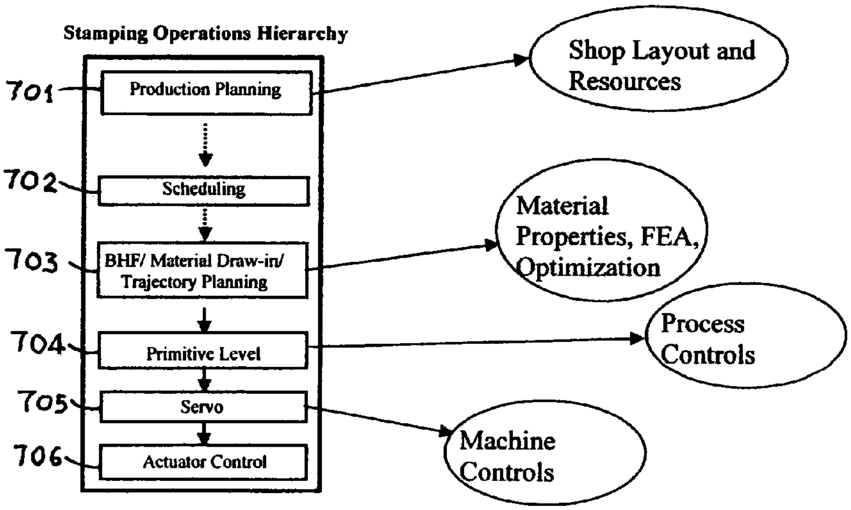
FIG. 7 illustrates knowledge-based hierarchy in the stamping operation as applied in one form of the present invention; and, FIG. 8 illustrates a general purpose computing platform that can be used in the practice of the invention.
Figure 6:
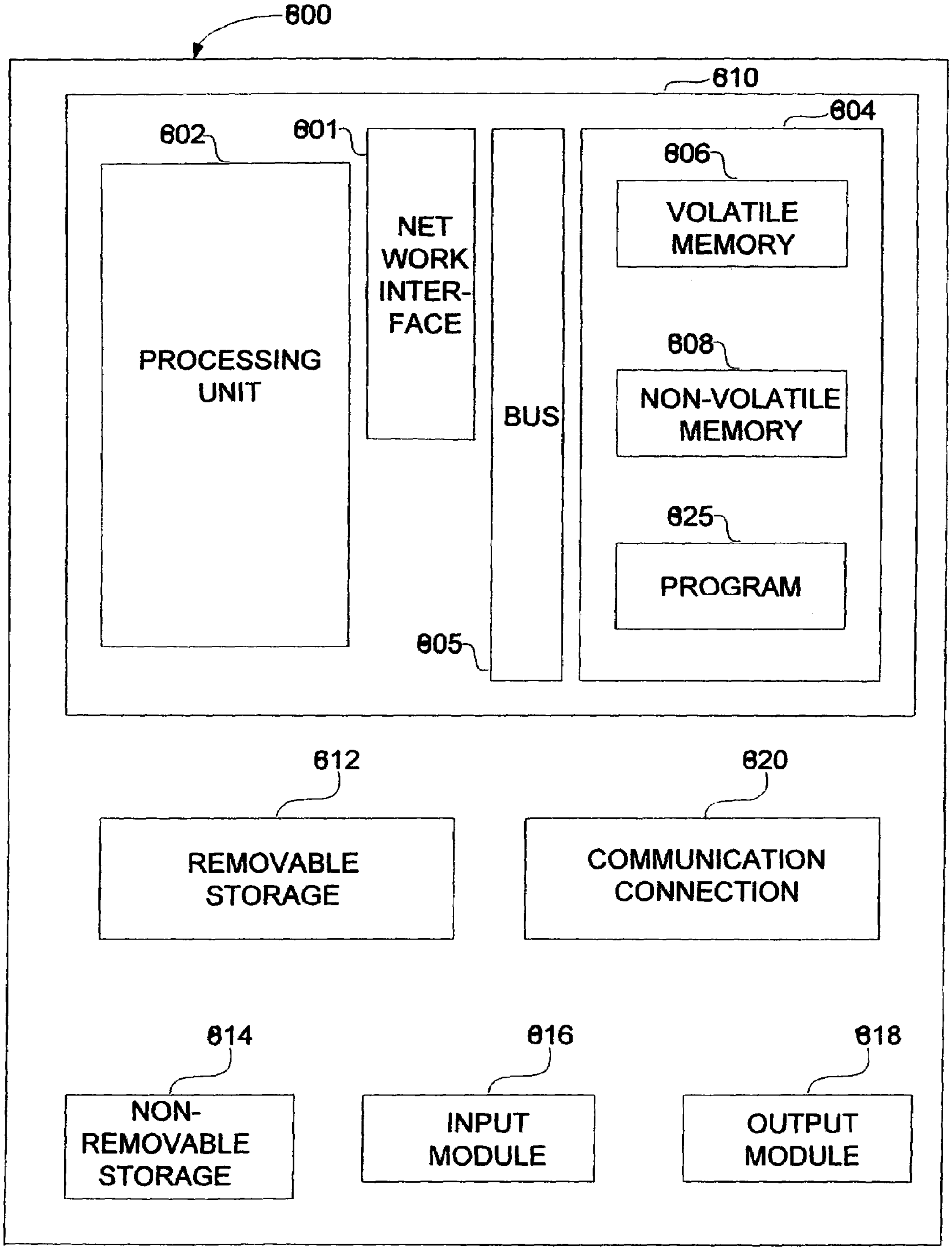

FIG. 7 diagrammatically illustrates an example of the stamping operation knowledge-based hierarchy which includes production planning 701, scheduling 702, trajectory planning 703, primitive level block 704, servo block 705 and actuator control 706. Production planning unit 701 provides knowledge of shop resources; unit 703 provides material properties, finite element analysis (FEA) inputs and optimization knowledge; block 704 provides process control knowledge, and servo block 705 provides machine control knowledge, and relates to the block 411 (operator input/monitoring) of FIG. 4.

The algorithm described in the context of FIG. 5 is just an example and interacts with layers of software and knowledge-based hierarchy. Modifications may be made in the software without departing from the thrust of the process. As described, the algorithm works in conjunction with a knowledge-based reconfigurable variable blank-holder force system for producing sheet metal stampings and uses a portable unit providing a flexible configuration for a plurality of blank holder units. A multi-channel digital controller as shown in FIG. 4 allows implementation of a non-linear pressure control algorithm that can accommodate variations in monitored parameters such as press-speed, required force levels, and the number of blank holder units. The blank holder units may comprise hydraulic cylinders with servo-valves and quick disconnect hoses and couplings. The algorithm taught above is a nonlinear algorithm applicable in a software environment interacting with a knowledge-based expert system and an operator-assisted GUI, and accounts for a reconfigurable number of operational hydraulic cylinders, valve non-linearity and pressure-drops across hoses for the hydraulic cylinders. The system enables a practical and economical transition from a try-out stage to the manufacturing stage for stamping production assisted by a knowledge-based expert system. The system may include optional sensors for monitoring frictional force and stamping material flow. A host personal computer may be used to interact with the multi-channel digital controller. It is understood that modifications to the nonlinear algorithm and the article containing the storage medium are envisaged without departing from the thrust of the inventive process and are within the ambit of the invention.

Various embodiments of the present subject matter can be implemented in software, which may be run in the environment shown in FIG. 8 (to be described below) or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

FIG. 8 shows an example of a suitable computing system environment for implementing embodiments of the present subject matter. FIG. 8 and the following discussion are intended to provide a brief, general description of a suitable computing environment in which certain embodiments of the inventive concepts contained herein may be implemented.

A general computing device, in the form of a computer 810, may include a processing unit 802, memory 804, removable storage 812, and non-removable storage 814. Computer 810 additionally includes a bus 805 and a network interface (NI) 801.

Computer 810 may include or have access to a computing environment that includes one or more user input devices 816, one or more output devices 818, and one or more communication connections 820 such as a network interface card or a USB connection. The one or more user input devices 816 can be a touch screen and a stylus and the like. The one or more output devices 818 can be a display device of computer, computer monitor, TV screen, plasma display, LCD display, display on a touch screen, display on an electronic tablet, and the like. The computer 810 may operate in a networked environment using the communication connection 820 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 804 may include volatile memory 806 and non-volatile memory 808. A variety of computer-readable media may be stored in and accessed from the memory elements of computer 810, such as volatile memory 806 and non-volatile memory 808, removable storage 812 and non-removable storage 814. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like, chemical storage, biological storage, and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 802 of the computer 810. For example, a computer program 825 may include machine-readable instructions capable of implementing a reconfigurable variable force blank-holder system for making sheet metal stampings according to the teachings and herein described embodiments of the present subject matter. In one embodiment, the computer program 825 may be included on a CD-ROM and loaded from the CD-ROM to a hard drive in non-volatile memory 808. The machine-readable instructions cause the computer 810 to decode according to the various embodiments of the present subject matter.

The foregoing is the description of exemplary implementations of a reconfigurable knowledge-based variable force blank-holder system, the implementations being intended to be applicable to all sheet metal stampings which are produced after a try-out stage extending into the manufacturing stage. The description, algorithm and the control system are intended to be exemplary and illustrative, and not restrictive. Many modifications can be made to the examples described hereinabove, without departing from the thrust of the invention. The scope of the invention is limited only by the attached claims and their equivalents.

The invention claimed is:

1. A method of achieving reconfigurability in a blank-holder variable force system for producing stampings from sheet metal blanks, comprising:

using movable blank-holder force actuators and variable blank-holder forces to hold and support said sheet metal blank at a first set of blank-holder force actuator locations;

monitoring a first set of parameters selectively including punch force, blank-holder force actuator numbers and locations, and blank-holder force magnitudes at said movable blank-holder force actuators;

inspecting a sheet metal stamping work piece produced using said first set of parameters;

noting differences between characteristics of a sample work piece fabricated using said first set of parameters, and requirements of an acceptable sheet metal stamping work piece; and, using said differences and knowledge-based inputs from an expert system to arrive at a second set of new reconfigurable parameters.

2. The method as in claim 1, wherein said knowledge-based inputs include different layers of software and knowledge-based hierarchy, and wherein said movable blank-holder force actuators include cylinders, said method including monitoring pressures and displacements in at least at some of said cylinders.

3. The method as in claim 2, including the step of making said movable blank-holder force actuators hydraulic, wherein said step of monitoring includes monitoring variable numbers of operational cylinders, valve nonlinearities and pressure drop across hydraulic hoses.

4. The method as in claim 2, including the step of adjusting the punch force and blank-holder force magnitudes during a stroke, for each movable blank-holder force actuator location.

5. The method as in claim 1, including the step of using a knowledge-based user interface inputs to enable the user selectively for said monitoring and for providing control information to said system, and for automatically adjusting said first set of parameters to arrive at said second set of parameters, and progressively a new set of parameters as necessary.

6. The method as in claim 2, including the step of providing servo valves for each said cylinder and mounting each said cylinder on a portable unit with a pump.

7. The method as in claim 6, wherein said system includes a die, punch and a press, said method including providing each said cylinder with a base mount for enabling mounting under one of said die, punch and the press.

8. The method as in claim 1, wherein said step of monitoring uses sensors, including using a multi-channel digital controller connected to use information from said sensors after modification by knowledge-based software and knowledge-based hierarchy.

9. The method as in claim 8, including the step of sending signals from said sensors to servo-valves, using a nonlinear algorithm accounting for said parameters.

10. The method as in claim 2, wherein said user interface comprises a graphical user interface (GUI) including using a software environment associated with said GUI, for monitoring stroke force and punch force in the system for recording trial runs.

11. The method as in claim 10, including the step of using said software environment for reconfiguring said blank-holder force actuator locations and said force magnitudes.

12. A variable blank-holder force system for performing sheet metal stamping operations, comprising:

movable blank-holder force actuators to hold and support said sheet metal stamping at a first set of locations;

sensors associated with said movable blank-holder force actuators for monitoring parameters associated with the blank-holder force actuators including blank-holder force actuator locations and force magnitudes at the blank-holder force actuator locations;

a user interface for viewing and using a first set of parameters for a trial run and for recording differences between a stamped sheet metal from a trial run compared with requirements in an acceptable stamped sheet metal work piece; and, a controllable arrangement for arriving at a second set of parameters based on said differences, knowledge-based software controlled by an expert system and knowledge-based hierarchy.

13. The system as in claim 12, where said controllable arrangement includes a hydraulic system.

14. The system as in claim 12, wherein said controllable arrangement is configured to indicate combinations of new blank-holder force actuator locations and force magnitudes corresponding to said second set of parameters.

15. The system as in claim 12, wherein said sensors include a displacement sensor and a pressure transducer associated with at least some of said movable blank-holder force actuators.

16. The system as in claim 12, including additional optional sensors comprising sensors for measuring frictional force and material flow of stamped sheet metal work pieces.

17. The system as in claim 16, including signal-conditioners for conditioning signals produced by said sensors associated with said movable blank-holder force actuators and said additional optional sensors.

18. The system as in claim 17, including a control unit for receiving outputs from said signal conditioners.

19. The system as in claim 18, wherein said control unit comprises a digital control unit.

20. The system as in claim 19, including a data store connected to said digital control unit, and current-drivers responsive to control signals generated by said digital control unit.

21. The system as in claim 19, wherein said digital control unit is connected to interact with said user interface unit, the system including a data store cooperating with said digital control unit.

22. The system as in claim 19, including a knowledge base/simulating data store connected to said digital control unit.

23. The system as in claim 19, wherein said additional sensors are connected to said digital control unit to provide signals and assist in arriving at said second set of parameters.

24. The system as in claim 23, configured to be suitable for try-out runs as well as production runs for manufacturing sheet metal stamping work pieces.

25. The system as in claim 12, wherein each said movable blank-holder force actuator includes a hydraulic cylinder, including a flexible quick-disconnect hose connected to each said cylinder.

26. An article comprising a storage medium with software thereon which when executed on a computing platform, results in a method for achieving reconfigurability in a blank-holder variable force system for sheet metal stamping, comprising the steps of:

using movable blank-holder force actuators and variable blank-holder force s to hold and support said sheet metal blank at a first set of blank-holder force actuator locations;

monitoring a first set of parameters selectively including punch force, blank-holder force actuator locations, and blank-holder force magnitudes at said movable blank-holder force actuators;

inspecting a sheet metal stamping work piece produced using said first set of parameters;

noting differences between characteristics of a sample work piece fabricated using said first set of parameters, and requirements of an acceptable sheet metal stamping work piece; and, using said differences and knowledge-based inputs from an expert system to arrive at a second set of new parameters.

27. The method as in claim 5, including the step of automatically generating process and quality control metrics by selectively using past try-out runs and recommendations for a given stamping.

28. The method as in claim 9, wherein the algorithm is modified to choose parameters after accounting for operational variations including changes in lubrication and misalignments and die-wear.

29. The system as in claim 12, including a software module containing a software based expert system using information from past try-out runs and reconfigurable variable blank-holder force setting recommendations.

* * * * *